US006813802B2

(12) United States Patent
Buchanan, Jr.

(10) Patent No.: US 6,813,802 B2
(45) Date of Patent: Nov. 9, 2004

(54) PRESTRESSED WIPER ARM

(75) Inventor: Harry Charles Buchanan, Jr., Dayton, OH (US)

(73) Assignee: Valeo Electrical Systems, Inc., Auburn Hills, MI (US)

(*) Notice: Subject to any disclaimer, the term of this patent is extended or adjusted under 35 U.S.C. 154(b) by 15 days.

(21) Appl. No.: 10/184,455

(22) Filed: Jun. 28, 2002

(65) Prior Publication Data
US 2004/0000021 A1 Jan. 1, 2004

(51) Int. Cl.[7] .............................. B60S 1/32; B60S 1/34
(52) U.S. Cl. ........................... 15/250.351; 29/897.2; 29/452
(58) Field of Search .................. 15/250.351, 250.352, 15/250.34, 250.21, 250.23, 250.19, 250.202, 250.04; 29/897.2, 446, 452

(56) References Cited

U.S. PATENT DOCUMENTS

| | | | |
|---|---|---|---|
| 2,613,385 A | 10/1952 | Wylie | 15/250.351 |
| 3,387,316 A | 6/1968 | Pearse | 15/250.351 |
| 3,480,985 A | 12/1969 | Forster | 15/250.351 |
| 3,623,183 A * | 11/1971 | Wilfert | 15/250.351 |
| 3,670,356 A | 6/1972 | Sakamoto | 15/250.351 |
| 4,118,825 A * | 10/1978 | Hoebrechts et al. | 15/250.32 |
| 4,581,786 A | 4/1986 | Brummer et al. | 15/250.351 |
| 4,864,678 A | 9/1989 | Stevens | 15/250.351 |
| 5,430,909 A * | 7/1995 | Edele et al. | 15/250.351 |
| 5,634,235 A * | 6/1997 | Hultquist et al. | 15/250.34 |
| 2003/0233724 A1 * | 12/2003 | Weiler et al. | 15/250.351 |

FOREIGN PATENT DOCUMENTS

| | | |
|---|---|---|
| DE | 100 52 616 A1 | 5/2002 |
| EP | 0 299 708 A2 | 1/1989 |
| FR | 2 515 121 | 4/1983 |
| GB | 2 151 465 | 7/1985 |

* cited by examiner

Primary Examiner—Gary K. Graham
(74) Attorney, Agent, or Firm—J. Gordon Lewis

(57) ABSTRACT

A wiper arm and method for manufacturing a wiper arm provides a body having a first end connectible to and supportable by a drive shaft for imparting oscillatory rotary movement and a second end connectible to and supporting a wiper blade. A torsional region of the body is capable of toggle action and is located between the first and second ends of the body. The toggle action is defined by two stable positions, a primary position and a secondary position, lying spaced at opposite sides of an unstable range of movement, where one of the two stable positions exerts downward pressure on the wiper blade connectible to the body for engagement against a windscreen to be wiped. The torsional region is defined by first and second torsional members initially formed in a relaxed state. Each torsional member has a free end cantilevered outwardly from the first end of the body and spaced from one another. Each torsional member is subsequently flexed into a flexed state such that the free ends engage one another. The free ends are connected with respect to one another by any suitable attachment method or fastener when in the flexed state.

23 Claims, 2 Drawing Sheets

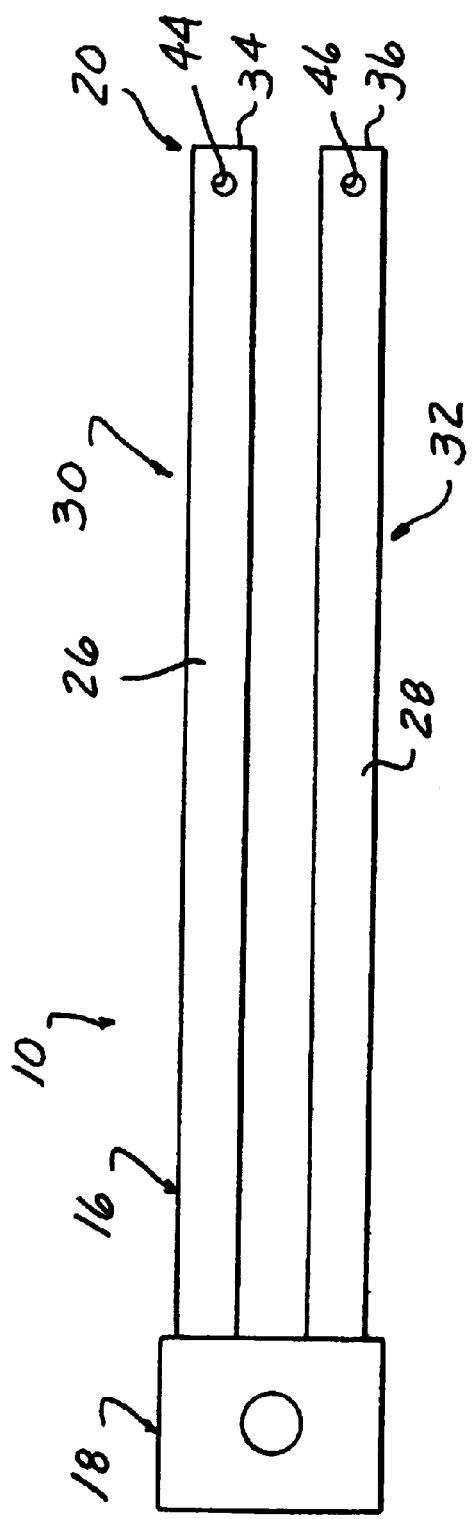
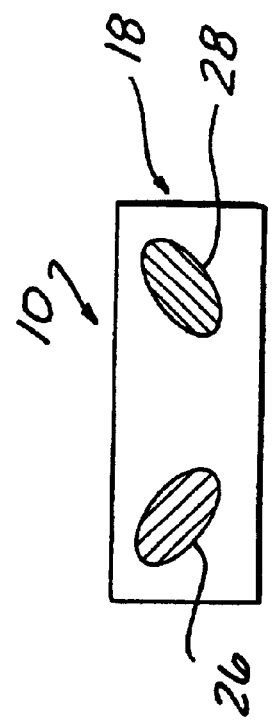

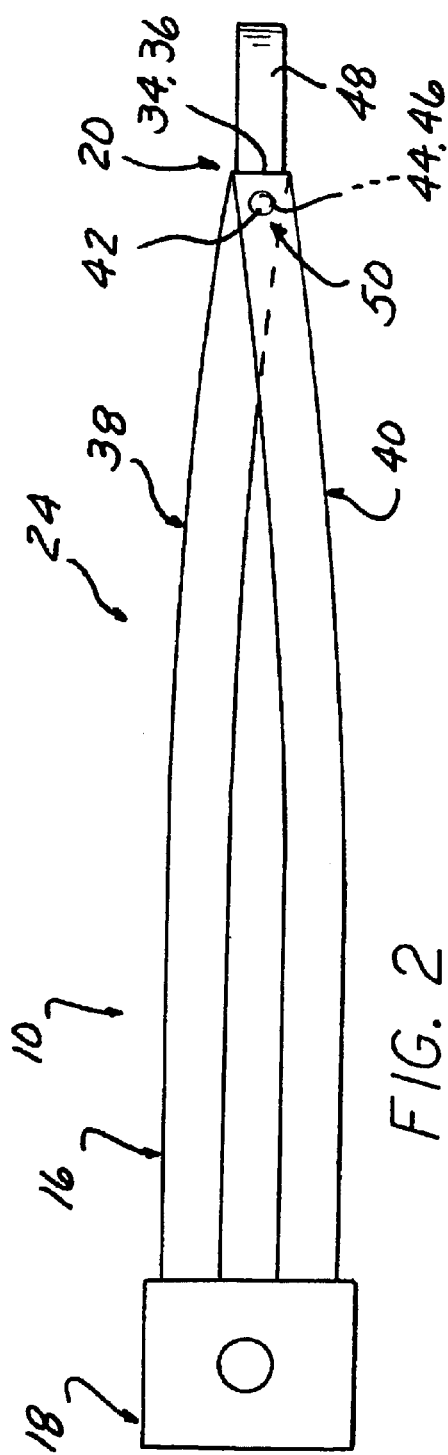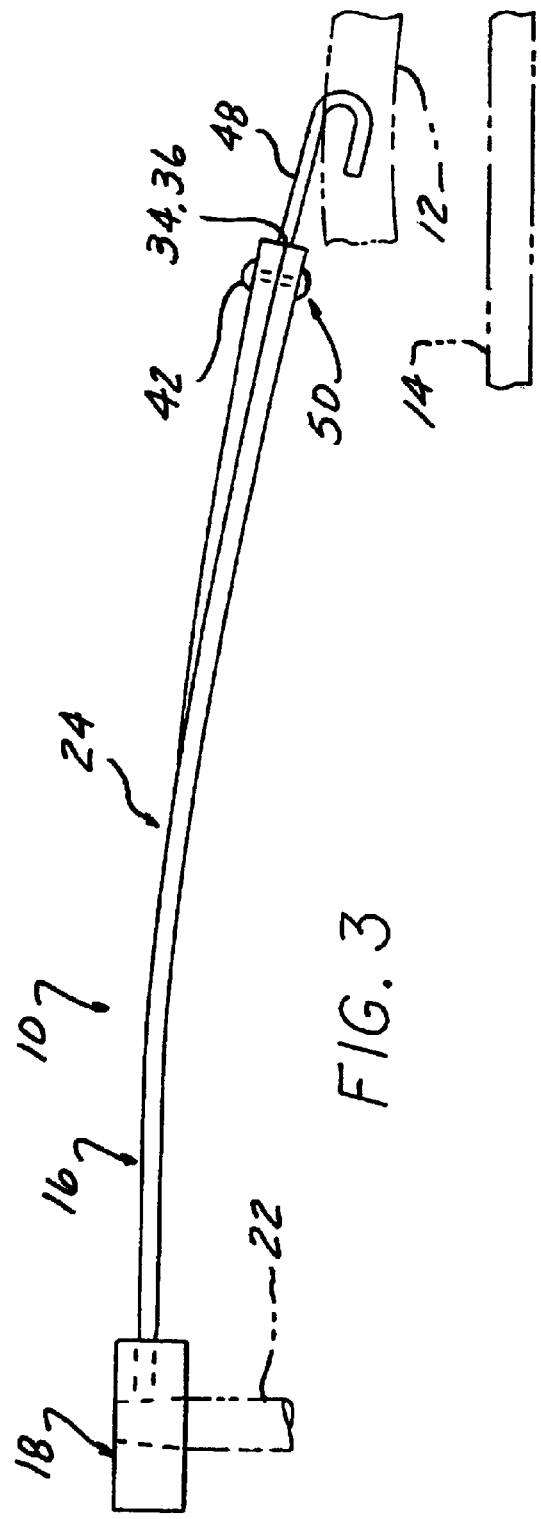
FIG. 2
FIG. 3

PRESTRESSED WIPER ARM

FIELD OF THE INVENTION

The present invention relates to a wiper arm for supporting a wiper blade for oscillatory rotary movement with respect to a windscreen and the method of making a wiper arm.

BACKGROUND OF THE INVENTION

A wiper arm is connectible to a wiper blade and supports the wiper blade with respect to a windscreen to be wiped with a force or load acting to maintain the wiper blade in contact with the windscreen during the oscillatory rotary movement of the wiper blade across the windscreen even at high vehicle speeds. The wiper arm is securely attached at one end to a drive shaft for imparting oscillatory rotary movement to the wiper blade connected at an opposite end of the wiper arm. A wiper arm is typically movable from the primary position where the wiper blade is engaged against the windshield, to a secondary position where the wiper blade is spaced from the windscreen allowing routing maintenance and/or cleaning of the wiper blade assembly. These movement requirements of the wiper arm have led to conventional wiper arms being complex assemblies with many individual parts, which are costly to manufacture. Typically, two spring mechanisms have been required to provide the ability to move between the primary and secondary positions of the wiper arm. In some instances, the first spring mechanism is provided by the resiliency of the material of the wiper arm itself, while the other spring mechanism is provided by a separate coil spring. When using a separate coil spring, the wiper arm structure must be modified to at least partially enclose the coil spring to protect it from the elements. The head of the wiper arm typically engages a conventional splined cylindrical drive shaft using a rigid, matching splined socket adjacent one end of the wiper arm.

SUMMARY OF THE INVENTION

It would be desirable in the present invention to provide a wiper arm having a simpler structural configuration while maintaining the ability to move from a primary position to a secondary position allowing firm engagement with a windscreen during wiping movement with the wiper arm in the primary position and permitting routine maintenance and cleaning of the wiper blade when the wiper arm is in the secondary position spaced from the windscreen. It would be desirable in the present invention to provide a wiper arm of a simple construction capable of cost effective production. It would be desirable in the present invention to provide a method of manufacturing a wiper arm of simple construction in a cost effective manner.

According to the present invention, a method for manufacturing a wiper arm is disclosed. The wiper arm supports a wiper blade for oscillatory rotary movement with respect to a windscreen. The method includes the steps of forming a body having a first end and a second end, where the first end of the body is connectible to and supportable by a drive shaft for imparting oscillatory rotary movement, and where the second end of the body is connectible to and supporting a wiper blade. The method of manufacturing according to the present invention forms a torsional region of the body capable of toggle action defined by two stable positions lying spaced at opposite sides of an unstable range of movement, where one of the two stable positions exerts downward pressure on a wiper blade connectible to the body for engagement against a windscreen to be wiped. In the preferred configuration, the method initially forms the torsional region of the body to be defined by first and second torsional members, where each torsional member when in a relaxed state has a free end cantilevered outwardly from the first end of the body and spaced from one another. The method for manufacturing according to the present invention in the preferred configuration subsequently flexes each torsional member from the relaxed state into a flexed state such that the free ends engage one another and thereafter the free ends of the torsional members are connected with respect to one another when in the flexed state.

A wiper arm according to the present invention, such as a wiper arm manufactured by the method according to the present invention, supports a wiper blade for oscillatory rotary movement with respect to a windscreen. The wiper arm includes a body having a first end and a second end, where the first end of the body is connectible to and supportable by a drive shaft for imparting oscillatory rotary movement, and where the second end of the body is connectible to and supports a wiper blade. The wiper arm according to the present invention includes a torsional region of the body capable of toggle action and located between the first and second ends of the body. The toggle action is defined by two stable positions lying spaced at opposite sides of an unstable range of movement, where one of the two stable positions exerts downward pressure on a wiper blade connectible to the body for engagement against a windscreen to be wiped.

In the preferred configuration of the wiper arm, the torsional region is defined by first and second torsional members initially formed in a relaxed state, where each torsional member has a free end cantilevered outwardly from the first end of the body and spaced from one another, where each torsional member is subsequently flexed into a flexed state such that the free ends engage one another. According to the preferred embodiment of the wiper arm means are provided for connecting the free ends of the torsional members with respect to one another when in the flexed state.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a plan view of a first step in a method according to the present invention for manufacturing a wiper arm according to the present invention where a body is formed having first and second ends such that the first end of the body is connectible to and supportable by a drive shaft for imparting oscillatory rotary motion and the second end of the body is connectible to and supporting a wiper blade;

FIG. 2 is a plan view of a second step in the method according to the present invention for manufacturing a wiper blade according to the present invention where the torsional region of the body capable of toggle action is formed;

FIG. 3 is a side view of the wiper arm according to the present invention manufactured according to the method of the present invention; and FIG. 4 is a cross sectional view of one possible configuration of the first and second torsional members set at an initial angle with respect to one another to create a bias toward one of two stable positions.

DETAILED DESCRIPTION OF THE PREFERRED EMBODIMENT

Referring now to FIGS. 1–3, a method for manufacturing a wiper arm 10 according to the present invention is illustrated. The wiper arm 10 supports a wiper blade 12 for oscillatory rotary movement with respect to a windshield or windscreen 14. In the first step as seen in FIG. 1, a body 16 is formed having a first end 18 and a second end 20. The first end 18 of the body 16 is connectible to and supportable by a drive shaft 22 for imparting oscillatory rotary movement to the wiper arm 10. The second end 20 of the body 16 is connectible to and supports a wiper blade 12 for oscillatory rotary movement with respect to the windscreen 14. A torsional region 24 of the body 16 is formed to be capable of toggle action defined by two stable positions lying spaced at opposite sides of an unstable range of movement. One of the two stable positions, such as a primary position of the wiper arm 10 exerts downward pressure on the wiper blade 12 connectible to the body 16 for engagement against the windscreen 14 to be wiped.

In the preferred method according to the present invention, the torsional region 24 of the body 16 is initially formed to be defined by first and second torsional members 26, 28. Each torsional member 26, 28 when in a relaxed state 30, 32, as best seen in FIG. 1, has a free end 34, 36 cantilevered outwardly from the first end 18 of the body 16 and spaced from one another. Subsequently, each torsional member 26, 28 is flexed from the relaxed state 30, 32 into a flexed state 38, 40, as best seen in FIGS. 2 and 3, so that the free ends 34, 36 engage with one another. The free ends 34, 36 of the torsional members 26, 28 are then connected with respect to one another when in the flexed state 38, 40 according to the preferred method of the present invention.

The flexing step according to the method of the present invention preferably overlaps portions of the free ends 34, 36 of the torsional members 26, 28 with respect to one another. The connecting step according to the method of manufacturing a wiper arm 10 can include the step of engaging a fastener 42 through aligned apertures 44, 46 in the overlapped portions of the free ends 34, 36 of the torsional members 26, 28. An attachment member 48 can be attached to the second end 20 of the body 16 for supporting a wiper blade 12 to be connected thereto. In the preferred configuration, the torsional members 26, 28 can be formed of a composite material including cross-linked fibers to improve torsional capability of the wiper arm 10. A cross section of the body 16, and/or the torsional members 26, 28, can vary from the first end 18 to the second end 20 to achieve a desired initial load capability when in the flexed or bent state 38, 40. The entire assembly can be overmolded with a low modulus material if desired.

A wiper arm according to the present invention, such as a wiper arm manufactured according to the method of the present invention, supports a wiper blade 12 for oscillatory rotary motion with respect to a windscreen 14. The wiper arm includes a body 16 having a first end 18 and a second end 20. The first end 18 of the body 16 is connectible to and supportable by a drive shaft 22 for imparting oscillatory rotary movement thereto. The second end 20 of the body 16 is connectible to and supports a wiper blade 12. A torsional region 24 of the body 16 is capable of toggle action and is located between the first end 18 and the second end 20 of the body 16. The toggle action is defined by two stable positions, such as a primary position and a secondary position, lying spaced at opposite sides of an unstable range of movement. One of the two stable positions, such as the primary position of the wiper arm 10 exerts downward pressure on a wiper blade 12 connectible to the body 16 for engagement against a windscreen 14 to be wiped.

In the preferred configuration of the wiper arm according to the present invention, the torsional region 24 is defined by first and second torsional members 26, 28 initially formed in a relaxed state 30, 32 as best seen in FIG. 1. Each torsional member 26, 28 has a free end 30, 32 cantilevered outwardly from the first end 18 of the body 16 and spaced from one another. Each torsional member 26, 28 subsequently is flexed into a flexed state 38, 40 such that the free ends 34, 36 engage one another as best seen in FIGS. 2 and 3. Means 50 connects the free ends 34, 36 of the torsional members 26, 28 with respect to one another when in the flexed state 38, 40. Preferably, the torsional region 24 includes overlapping portions of the free ends 34, 36 of the torsional members 26, 28 with respect to one another. The connecting means 50 can include a fastener 42 engagable through aligned apertures 44, 46 formed in the overlapped portions of the free ends 34, 36 of the torsional members 26, 28.

An attachment member 48 is attachable to the second end 20 of the body 16 for supporting a wiper blade 12 to be connected thereto. The torsional members 26, 28 are preferably formed of a composite material including cross-linked fibers to improve torsional capability of the body 16. A cross section of the body 16 and/or torsional members 26, 28, can be varied from the first end 18 to the second end 20 to provide a desired initial load capability, such as a desired preload force of the wiper blade 12 against the windscreen 14 when the wiper arm 10 is in the primary position. If desired, the entire assembly or body 16 can be overmolded with a low modulus material.

Wiper arms are becoming longer to enable the wiper system to cover the larger windshield areas caused by high glass angles. This causes higher inertia's and potential excess wiper pattern growth due the reversal accelerations. The composite material choice lowers the inertia and reduces the growth. This concept also has a non-linear load to maintain a near constant arm pressure and further has the ability to be pulled into a position away from the glass to be out of the way to manually clean the glass by hand. As in FIG. 1, when two pultruted shapes are placed parallel, diverging, or converging, and molded or bonded into place, the shapes exhibit beam deflection characteristics (similar to $F=K*X$). The shapes, when viewed from the end of the arm, can be parallel or at an angle to one another. When the tips of the composite shapes are brought together with the blade attachment, and fixed together, the cross section as illustrated in FIGS. 2 and 3 will twist causing a predisposition of deflection, biased either into the page or out of the page as shown in FIG. 2. The present invention provides a biasing force that is different than the "spring" characteristics. In particular, the force at the end of the arm in FIGS. 2 and 3, will be zero in the primary and secondary positions, and is also zero just at the "flip" point between the primary and secondary positions. Therefore the arm will exhibit nonlinear force properties. When the arm is lifted to the out or secondary position, the arm stays in the out or secondary position, allowing the driver to manually clean the glass under the blade. The two pultruted shapes can be riveted or overmolded at the free ends 34,36 as illustrated in FIGS. 2 and 3. The entire unit can be overmolded with a low modulus material like a reaction injection molded polyurethane. This overmolded material can be provided in any color desired and can be used to hide the washer delivery system. It should be noted that, pultrusion can be made with 45° biased angle fiber material for extra torsional rigidity and for increased pressure.

Referring now to FIG. 4, the first and second torsional members can be set at an initial angle with respect to one another to create a bias toward one of the two stable positions. In any of the described configurations, the body and/or torsional members can be formed of composite materials, such as carbon fiber, steel, aluminum, or other suitable materials. The first and second torsional members can also be initially formed in a relaxed position having free ends relatively close to one another, where the torsional members are spread apart to the flexed position and held relative to one another. The connecting means can be a molded end piece holding the free ends of the first and second torsional members in a predetermined relationship with respect to one another.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for manufacturing a wiper arm for supporting a wiper blade for oscillatory rotary movement with respect to a windscreen comprising the steps of:
   forming a body having a first end and a second end, the first end of the body being connectible to and supportable by a drive shaft for imparting oscillatory rotary movement, and the second end of the body being connectible to and supporting a wiper blade;
   forming a torsional region of the body capable of toggle action defined by two stable positions lying spaced at opposite sides of an unstable range of movement, where one of the two stable positions exerts downward pressure on a wiper blade connectible to the body for engagement against a windscreen to be wiped;
   initially forming the torsional region of the body defined by first and second torsional members, each torsional member when in a relaxed state having a free end cantilevered outwardly from the first end of the body and spaced from one another;
   subsequently flexing each torsional member from the relaxed state into a flexed state such that the free ends engage one another; and
   connecting the free ends of the torsional members with respect to one another when in the flexed state.

2. The method of claim 1 wherein the flexing step further comprises the steps of:
   overlapping portions of the free ends of the torsional members with respect to one another.

3. The method of claim 2 wherein the connecting step further comprises the steps of:
   engaging a fastener through aligned apertures in the overlapped portions of the free ends of the torsional members.

4. The method of claim 1 further comprising the step of:
   attaching an attachment member to the second end of the body for supporting a wiper blade to be connected thereto.

5. The method of claim 1 further comprising the step of:
   forming the torsional members of composite material including cross-linked fibers to improve torsional capability.

6. The method of claim 1 further comprising the steps of:
   varying a cross-section of the body from the first end to the second end.

7. The method of claim 1 further comprising the step of:
   overmolding the body with a low modulus material.

8. A wiper arm manufactured according to the method of claim 1 for supporting a wiper blade for oscillatory rotary movement with respect to a windscreen comprising:
   a body having a first end and a second end, the first end of the body being connectible to and supportable by a drive shaft for imparting oscillatory rotary movement, and the second end of the body being connectible to and supporting a wiper blade; and
   a torsional region of the body capable of toggle action and located between the first and second ends of the body, the toggle action defined by two stable positions lying spaced at opposite sides of an unstable range of movement, where one of the two stable positions exerts downward pressure on a wiper blade connectible to the body for engagement against a windscreen to be wiped, the torsional region of the body initially formed and defined by first and second torsional members, each torsional member when in a relaxed state having a free end cantilevered outwardly from the first end of the body and spaced from one another, each torsional member subsequently flexed from the relaxed state into a flexed state such that the free ends engage one another, and the free ends of the torsional members connected with respect to one another when in the flexed state.

9. The wiper arm of claim 8 wherein the torsional region further comprises:
   overlapping portions of the free ends of the torsional members with respect to one another.

10. The wiper arm of claim 9 further comprising:
    a fastener engagable through aligned apertures in the overlapped portions of the free ends of the torsional members.

11. The wiper arm of claim 8 further comprising:
    an attachment member attachable to the second end of the body for supporting a wiper blade to be connected thereto.

12. The wiper arm of claim 8 further comprising:
    the torsional members formed of composite material including cross-linked fibers to improve torsional capability.

13. The wiper arm of claim 8 further comprising:
    a cross-section of the body varied from the first end to the second end.

14. The wiper arm of claim 8 further comprising:
    the body overmolded with a low modulus material.

15. The wiper arm of claim 8 further comprising:
    the torsional region extending from the first end to the second end along a longitudinal length of the body.

16. The wiper arm of claim 8 further comprising:
    a separate attachment member attachable to the second end of the body for supporting a wiper blade to be connected thereto.

17. A wiper arm for supporting a wiper blade for oscillatory rotary movement with respect to a windscreen comprising:

a body having a first end and a second end, the first end of the body being connectible to and supportable by a drive shaft for imparting oscillatory rotary movement, and the second end of the body being connectible to and supporting a wiper blade; and a torsional region of the body capable of toggle action and located between the first and second ends of the body, the toggle action defined by two stable positions lying spaced at opposite sides of an unstable range of movement, where one of the two stable positions exerts downward pressure on a wiper blade connectible to the body for engagement against a windscreen to be wiped, the torsional region defined by first and second torsional members initially formed in a relaxed state, each torsional member having a free end cantilevered outwardly from the first end of the body and spaced from one another, each torsional member subsequently flexed into a flexed state such that the free ends engage one another with overlapping portions of the free ends of the torsional members; and means for connecting the free ends of the torsional members with respect to one another when in the flexed state.

18. The wiper arm of claim 17 wherein the connecting means further comprises:

a fastener engagable through aligned apertures in the overlapped portions of the free ends of the torsional members.

19. The wiper arm of claim 17 further comprising:

an attachment member attachable to the second end of the body for supporting a wiper blade to be connected thereto.

20. The wiper arm of claim 17 further comprising:

the torsional members formed of composite material including cross-linked fibers to improve torsional capability.

21. The wiper arm of claim 17 further comprising:

a cross-section of the body varied from the first end to the second end.

22. The wiper arm of claim 17 further comprising:

the body overmolded with a low modulus material.

23. The wiper arm of claim 17 further comprising:

the first and second torsional members set at an initial angle with respect to one another to create a bias toward one of the two stable positions.

* * * * *